US00RE36931E

United States Patent [19]

Grantz et al.

[11] E Patent Number: Re. 36,931

[45] Reissued Date of Patent: Oct. 31, 2000

[54] MAGNETIC DISC STORAGE SYSTEM WITH HYDRODYNAMIC BEARING

[75] Inventors: Alan L. Grantz, Aptos; Wesley R. Clark, Watsonville, both of Calif.

[73] Assignee: Seagate Technology, Inc., Scotts Valley, Calif.

[21] Appl. No.: 09/159,116

[22] Filed: Sep. 23, 1998

Related U.S. Patent Documents

Reissue of:

[64] Patent No.: 5,559,651
Issued: Sep. 24, 1996
Appl. No.: 08/420,740
Filed: Apr. 12, 1995

[51] Int. Cl.[7] ..... G11B 17/02

[52] U.S. Cl. ..... 360/99.08; 360/99.12; 360/99.05

[58] Field of Search ..... 360/99, 98.07, 360/99.04, 99.05, 99.08, 99.12, 97.02; 369/258

[56] References Cited

U.S. PATENT DOCUMENTS

| | | | |
|---|---|---|---|
| 4,043,612 | 8/1977 | Orcutt | 308/9 |
| 4,285,016 | 8/1981 | Gilovich | 360/84 |
| 5,142,173 | 8/1992 | Konno et al. | 310/67 R |
| 5,142,174 | 8/1992 | Ide | 310/67 R |
| 5,215,385 | 6/1993 | Ide | 384/100 |
| 5,223,758 | 6/1993 | Kataoka et al. | 310/90 |
| 5,224,782 | 7/1993 | Miwa et al. | 384/100 |
| 5,246,294 | 9/1993 | Pan | 384/119 |
| 5,284,391 | 2/1994 | Diel et al. | 384/108 |
| 5,328,271 | 7/1994 | Titcomb | 384/108 |
| 5,358,339 | 10/1994 | Konno et al. | 384/107 |
| 5,376,850 | 12/1994 | Elsing et al. | 310/67 R |
| 5,448,120 | 9/1995 | Schaule et al. | 310/90 |

*Primary Examiner*—David L. Ometz
*Attorney, Agent, or Firm*—Westman, Champlin & Kelly, P.A.

[57] ABSTRACT

A magnetic disc storage system includes a base and a rotating magnetic disc having an axis of rotation. A transducing head which reads and writes information is positioned proximate the disc. The disc rotates on a rotating member relative to a fixed member which is attached to the base. In one embodiment, the hydrodynamic bearing has a shape which forms a portion of a sphere.

38 Claims, 7 Drawing Sheets

MAGNETIC DISC STORAGE SYSTEM WITH HYDRODYNAMIC BEARING

Matter enclosed in heavy brackets [ ] appears in the original patent but forms no part of this reissue specification; matter printed in italics indicates the additions made by reissue.

BACKGROUND OF THE INVENTION

The present invention relates to magnetic disc drive storage systems. More specifically, the present invention relates to a hydrodynamic bearing for use in a magnetic disc drive storage system.

Magnetic disc drives are used for magnetically storing information. In a magnetic disc drive, a magnetic disc rotates at high speed and a transducing head "flies" over a surface of the disc. The transducing head records information on the disc surface by impressing a magnetic field on the disc. Information is read back using the head by detecting magnetization of the disc surface. The transducing head is moved radially across the surface of the disc so that different data tracks can be read back.

Over the years, storage density has tended to increase and the size of the storage system has tended to decrease. This trend has lead to greater precision and lower tolerance in the manufacturing and operating of magnetic storage discs. For example, to achieve increased storage densities the transducing head must be placed increasingly close to the surface of the storage disc. This proximity requires that the disc rotate substantially in a single plane. A slight wobble or run-out in disc rotation can cause the surface of the disc to contact the transducing head. This is known as a "crash" and can damage the transducing head and surface of the storage disc resulting in loss of data.

From the foregoing discussion, it can be seen that the bearing assembly which supports the storage disc is of critical importance. One typical bearing assembly comprises ball bearings supported between a pair races which allow a hub of the storage disc to rotate relative to a fixed member. However, ball bearing assemblies have many mechanical problems such as wear, run-out and manufacturing difficulties. Thus, there has been search for alternative bearing assemblies for use with high density magnetic storage discs.

One alternative bearing design which has been investigated is a hydrodynamic bearing. In a hydrodynamic bearing, a lubricating fluid such as air or liquid provides a bearing surface between a fixed member of the housing and a rotating member of the disc hub. In addition to air, typical lubricants include oil or ferromagnetic fluids. Hydrodynamic bearings spread the bearing interface over a large surface area in comparison with a ball bearing assembly which comprises a series of point interfaces. This is desirable because the increased bearing surface reduces wobble or run-out between the rotating and fixed members.

However, hydrodynamic bearings themselves suffer from a number of disadvantages. These disadvantages include a low stiffness-to-power ratio and a likelihood of damage due to gyroscopic precession. These problems lead to a high sensitivity of the bearing to external loads or shock.

SUMMARY OF THE INVENTION

A magnetic disc storage system includes a base and a rotatable magnetic storage disc having an axis of rotation. A transducing head proximate a surface of the disc is used for reading and writing information on the disc surface. A rotating member attached to the disc rotates about a fixed member attached to the base on an axis of rotation. The rotating and fixed members form a hydrodynamic bearing therebetween having a surface which forms an interface between the two members. Angles of the interface relative to the axis of rotation are acute. In one embodiment, a width of the inner face proximate a central portion of the bearing is less than a width of the inner face distal the central portion. Width is measured in a direction perpendicular to the axis of rotation.

In one embodiment, the interface forms a portion of a sphere which rotates in a sphere-shaped sleeve.

In one embodiment, the hydrodynamic bearing is manufactured using a process involving metal injection molding. The axial position of the bearing is determined using a self-positioning technique in which the bearing is automatically positioned within the disc storage system such that tolerances are less critical. In one embodiment, this includes injecting air into the hydrodynamic bearing such that a gap of the interface is set within predetermined limits.

The hydrodynamic bearing assembly provides an increased restoring force in response to wobble, run-out or gyroscopic precession of the bearing.

DETAILED DESCRIPTION OF THE PREFERRED EMBODIMENTS

Figure 1:
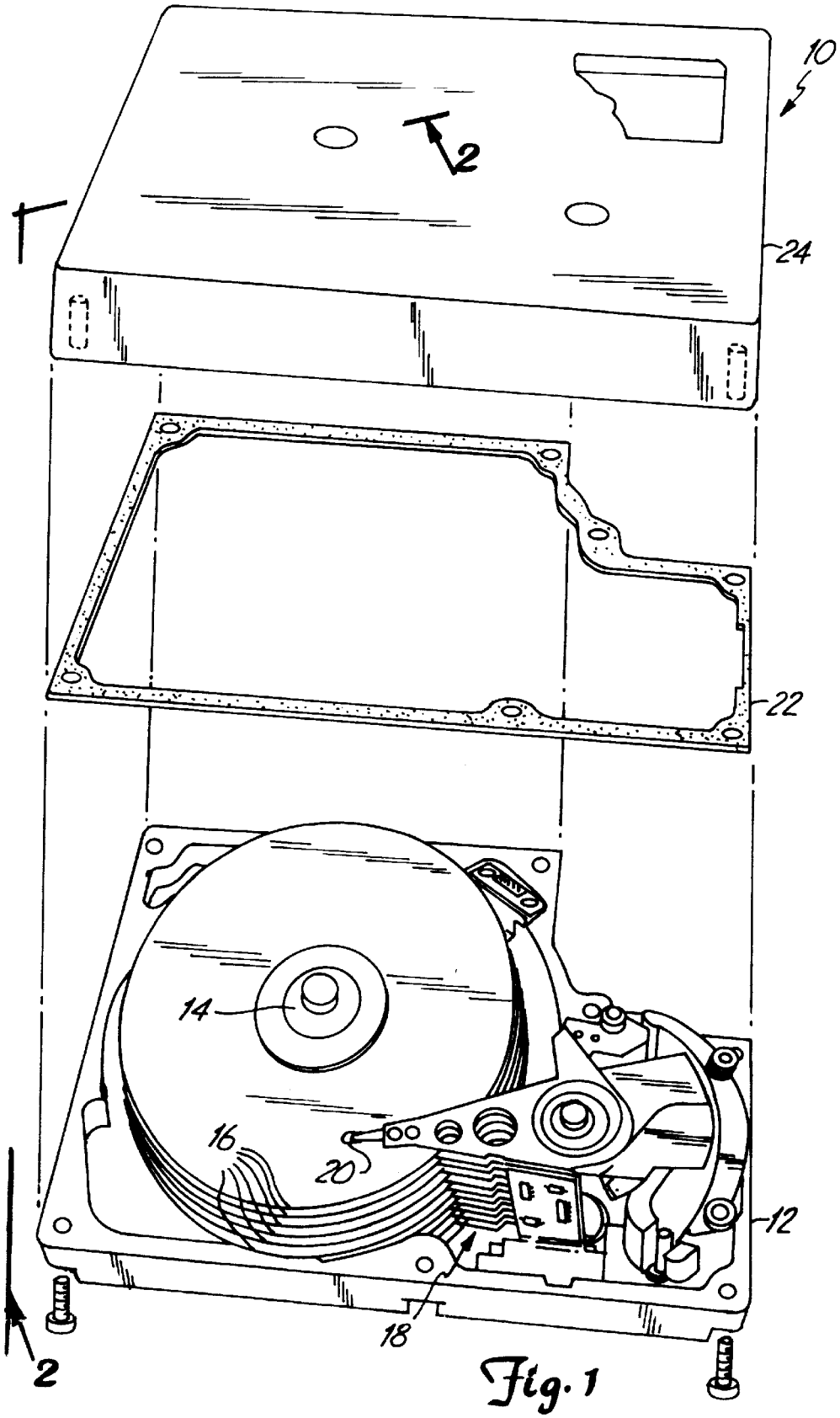
FIG. 1 is an exploded perspective view of a magnetic disc storage system including a hydrodynamic bearing in accordance with the invention.

FIG. 1 is an exploded perspective view of a magnetic disc storage system 10 in accordance with the present invention. Storage system 10 includes housing base 12 having drive rotor 14 which rotatably carries storage discs 16. An armature assembly 18 moves transducing heads 20 across surfaces of discs 16. The environment of discs 16 is sealed by seal 22 and cover 24. In operation, discs 16 rotate at high speed while transducing heads 20 are moved radially across the surfaces of discs 16. This allows transducing heads 20 to read and write magnetically encoded information on surfaces of discs 16 at selected locations.

Figure 2:
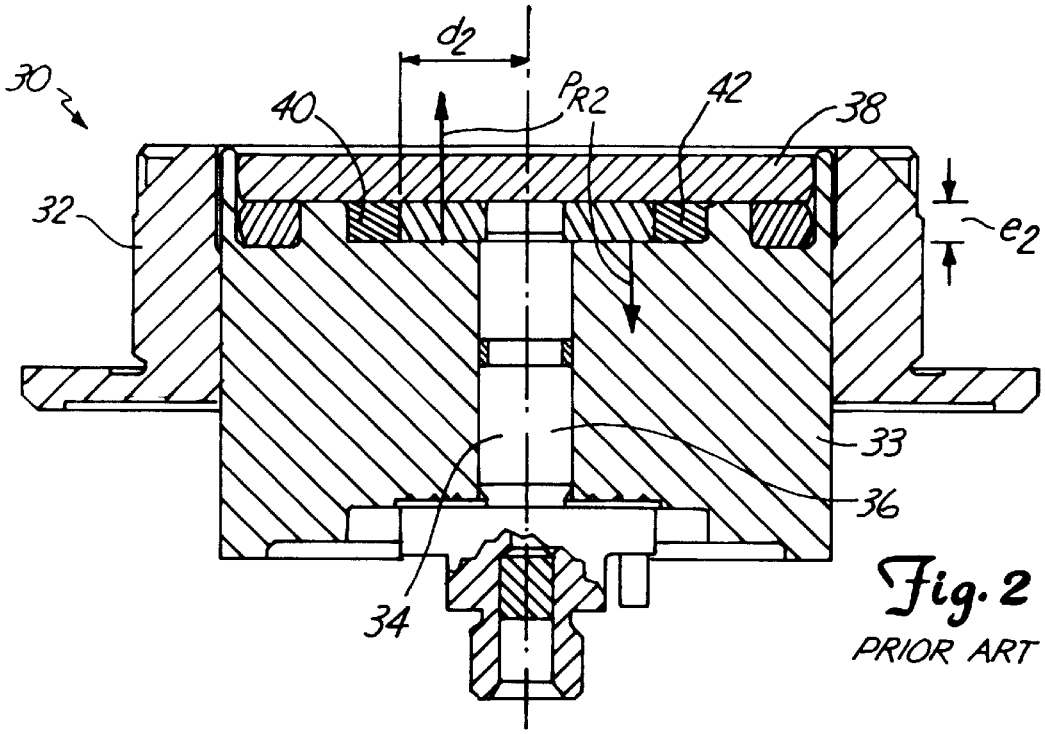
Fig. 2 PRIOR ART
FIG. 2 is a cross-sectional view of a prior art spindle assembly.

FIG. 2 is a cross-sectional view of a prior art drive spindle assembly 30 having a hydrodynamic bearing. Spindle assembly 30 includes a rotating hub 32 which rotates relative to a fixed shaft 34. Hub 32 includes sleeve 33 which receives a grooved journal 36 of fixed shaft 34. The hydrodynamic bearing includes counterplate 38 coupled to hub 32 and thrust plate 40 coupled to shaft 34. A hydrodynamic fluid 42 is carried in gaps between the fixed portion of the hydrodynamic bearing and the rotating portion. In operation, as hub 32 rotates the hydrodynamic fluid 42 is caused to circulate through the hydrodynamic bearing. The hydrodynamic fluid separates the rotating portions from the fixed portions and provides a bearing surface therebetween.

FIG. 2 shows dimensions $d_2$ and $e_2$. Dimension $d_2$ is the diameter of thrust plate 40 and $e_2$ is the thickness of thrust: plate 40. FIG. 2 also shows force $P_{R2}$.

Figure 3:
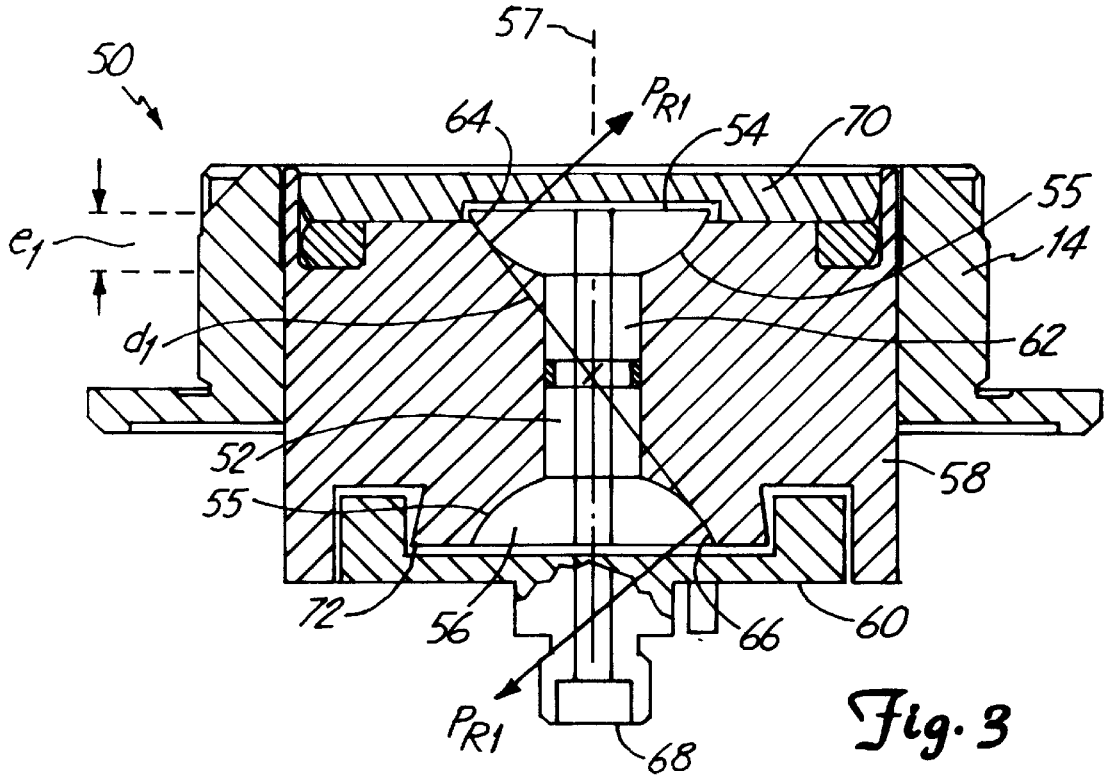
FIG. 3 is a cross-sectional view of the spindle assembly of FIG. 1.

FIG. 3 is a cross-sectional view of spindle 50 for disc drive storage system 10, shown in FIG. 1. Spindle 50 includes rotor 14 rotatably coupled to shaft 52. Shaft 52 includes upper hemisphere portion 54 and lower hemisphere portion 56 received in sleeve 58. Shaft 52 is fixedly attached to base 60 which may be a part of housing base 12. Sleeve 58 receives journal 62 of shaft 52 and has upper hemisphere-shaped receptacle 64 and lower hemisphere-shaped receptacle 66. A fill hole 68 is also provided to fixed member 52 and rotor 14 includes counterplate 70.

FIG. 3 also shows dimensions $e_1$ and $d_1$. Dimension $e_1$ is the thickness of hemispheres 54 and 56, and $d_1$ is the distance of a line which is tangent to a hemisphere 54,56 and which passes through the center of fixed member 52. FIG. 3 also shows a force $P_{R1}$. As shown in FIG. 3, the hydrodynamic interface 55 formed by portions 54 and 56 forms an acute angle with the axis of rotation 57 of spindle 50.

In operation, the bearings shown in both FIG. 2 and FIG. 3 are hydrodynamic bearings in which a lubricating fluid such as oil circulates through gaps between the fixed member and the rotating member. Rotation of the rotating member causes the lubricating fluid to circulate. As shown in FIG. 3, oil is trapped in the hydrodynamic bearing by a diverging capillary seal 72.

The invention resulted from a desire to improve the performance of hydrodynamic bearings with regard to external loads and shock. One aspect of the invention is directed to reducing the effects of gyroscopic precession on the motor. Further, the invention strengthens the motor in terms of its ability to withstand external loads and shock without sustaining damage.

This invention accomplishes these two primary goals through a number of aspects which include:

1. Increasing the stiffness to power ratio (rocking mode) of the bearing.
2. Increasing the bearing contact area and ensuring no line contact.
3. Increasing the bending strength and stiffness of the shaft/bearing structure.

The angular stiffness to power ratio of a hydrodynamic bearing is proportional to $(\text{length})^2 \div (\text{gap})^2$, where the length is the moment arm (d) of the restoring force and the gap refers to oil thickness within the bearing. As further reduction in gap size is difficult, the length term is altered by the invention. As the height of the motor is fixed, the invention changes the motor topology. This was done by incorporating a bi-spherical configuration, as shown in FIG. 3.

As shown in FIG. 3, the invention provides a "bi-spherical" hydrodynamic bearing. The stiffness of the bi-spherical bearing is increased over that of a bearing with a flat thrust plate, as shown in FIG. 2. In the bearing with a flat thrust plate, the angular restoring moment ($dM/d\theta$) is a function of the thrust plate diameter $d_2$ but not the overall length of the bearing or the distance from the thrust plate to the center of the bearing journal. This is not the case for the bi-spherical bearing. As can be seen from FIG. 3, the moment arm $d_1$ is a line drawn tangent to the hemisphere which passes through the journal's center. As the overall bearing length increases, the stiffness to power ratio will go up by $(\text{length})^2$. As compared to the bearing shown in FIG. 2, the bi-spherical bearing in FIG. 3 will have an angular stiffness increase of 20% with no increase in power consumption.

The threshold for shock, or contact related damage, is increased as the contact surfaces are essentially ball and socket joints. In other words, contact is made between two spherical surfaces with almost identical radii, separated by a film of oil.

The increased structural strength of the bearing is due to three factors:

1. The narrowest portion of the shaft (the journal center) is shorter in the bi-spherical design.
2. The stress concentrating geometry at the bottom of the shaft has been removed.
3. The hemispheres are approximately twice as thick as the existing thrust plates for the same size motor, thus the retaining force due to a press fit, or adhesive, will be twice as great. Also, the thicker cross section should allow a greater press fit interference with less distortion of the hemisphere.

The following equations show an advantage of the present invention as shown in FIG. 3 in comparison to the prior art shown in FIG. 2. The restoring moments for the bearings shown in FIGS. 3 and 2 are, respectively:

$$M_{R1}=2d_1P_{R1} \quad \text{Eq. 1}$$

$$M_{R2}=2d_2P_{R2} \quad \text{Eq. 2}$$

For the examples shown in FIGS. 3 and 2, $d_1=2d_2$ such that if the forces $P_{R1}$ and $P_{R2}$ are the same, $M_{R1}=2M_{R2}$. As shown in the Figures, this advantage of the present invention becomes greater as the overall height of the journal increases. In this example, the stiffness of the bearing of FIG. 3 is twice that of FIG. 2. However, the power loss is slightly greater using the inventive bearing than that of a typical prior art bearing. This power loss is much less than twice the power loss of the conventional bearing of FIG. 2. The increased power loss is due to the increased surface area of the bi-spherical bearing. This, for example, assumes the spherical bearing has a diameter of 6.6 mm versus an 8 mm diameter thrust plate of FIG. 2. Using these diameters, increasing the bearing length by 4.3 mm increases the angular stiffness approximately 30%. If an 8 mm diameter hemisphere is used and the bearing spacing is not increased, the angular stiffness will increase over 200% (as will the power consumption).

The present invention as shown in FIG. 3 also has improved alignment and strength over a conventional design as shown in FIG. 2. This is because the engagement thickness $e_1$ of spindle 50 is twice the engagement thickness $e_2$ of conventional spindle 30. The increased thickness $e_1$, where a hemisphere attaches to the shaft, provides a stronger connection between the hemisphere and the shaft in comparison to the prior art thrust plate and shaft shown in FIG. 2. This increased area can be used for bonding the hemisphere to the shaft. Another advantage of the present invention is that during tilt (gyroscopic precession), contact between a hemisphere portion and the sleeve will not be an edge contact as in a conventional design. Instead, the contact will be one smooth surface rubbing against another smooth surface, for example the curved surfaces of the hemispheres.

This causes the load to be spread out over a much greater area than in typical prior art designs.

The present invention also includes methods for assembling the hydrodynamic bearing assembly shown in FIG. 3. In one embodiment, sleeve 58 is made of aluminum which is heated to a temperature above ambient temperature, such as 90° C. above ambient temperature, so that it expands. For example, if the expansion were 0.8 $\mu$m/mm and the sleeve had a height of approximately 10 mm, the overall expansion would be approximately 8 $\mu$m, or 4 $\mu$m for the top side and 4 $\mu$m for the bottom side. While the sleeve is heated, the hydrodynamic bearing could be assembled such that hemisphere portions 54 and 56 are allowed to contact sleeve 58. As the sleeve cools, it will leave a 4 $\mu$m gap between each hemisphere and the sleeve. This concept can be extended by using different temperatures or other materials to achieve the desired interface gap. Similar materials can be used, but a greater temperature difference would be required. Example techniques for attaching a hemisphere to a shaft include: bonding, a press fitting, swaging, threading (i.e. the two parts are screwed together) or laser welding.

Figure 4:
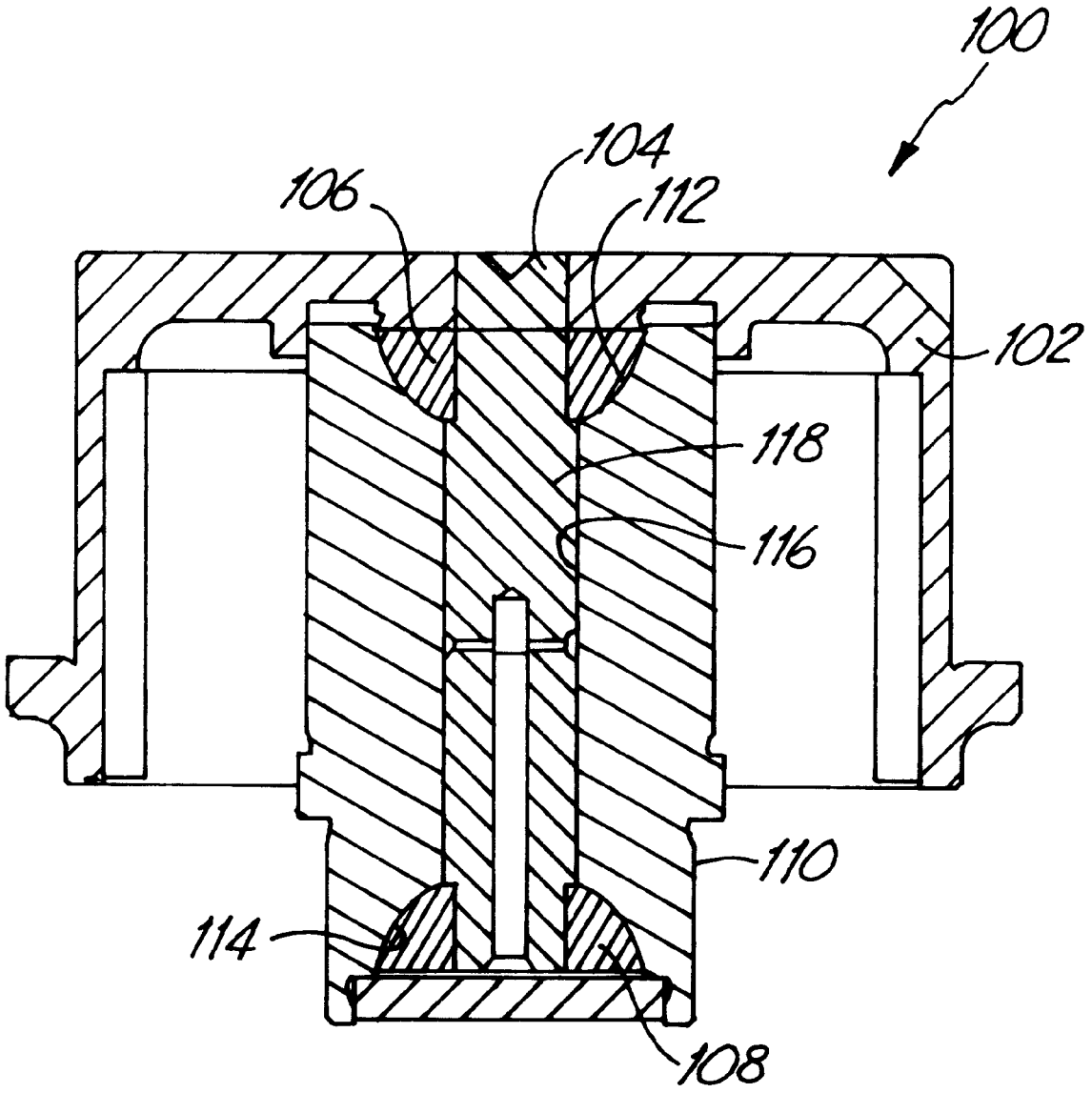
FIG. 4 is a cross-sectional view of a hydrodynamic bearing cartridge in a rotating shaft design.

Another embodiment includes making the hydrodynamic bearing as a discrete cartridge. This is attractive in a rotating shaft design because the hub is attached after the bearing is assembled. Such a design is shown at FIG. 4. FIG. 4 is a cross-sectional view of drive spindle assembly 100 for a rotating shaft design. Spindle assembly 100 includes hub 102 attached to shaft 104. Hemisphere portions 106 and 108 are connected to the top and bottom of shaft 104, respectively. Portions 106 and 108 and shaft 104 are received in fixed sleeve 110 which includes hemisphere receiving portions 112 and 114 for receiving portions 106 and 108, respectively, and journal receiving portion 116 for receiving journal 118 of shaft 104. In the embodiment of FIG. 4, fixed member 104 and hemisphere portions 106 and 108 rotate in sleeve 110 along a hydrodynamic interface thereby allowing hub 102 to rotate. In this embodiment, hub 102 can be bonded, screwed or otherwise attached to shaft 104 of the bearing cartridge following assembly of the bearing cartridge.

Figure 5:
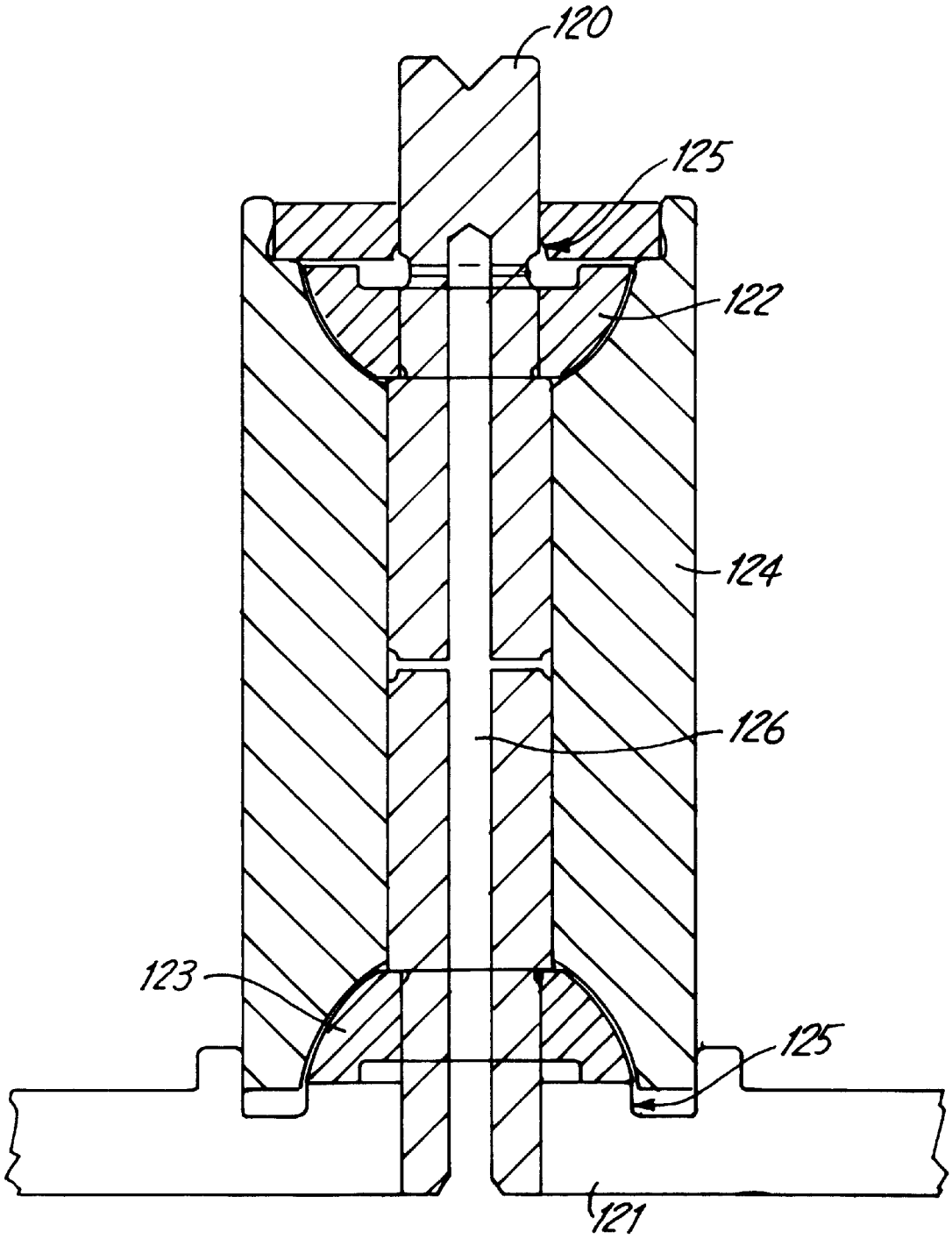
FIG. 5 is a cross-sectional view of a hydrodynamic bearing cartridge in a fixed shaft design.

FIG. 5 is a cross-sectional view of a cartridge-type design hydrodynamic bearing having a fixed shaft 120 which is attached to base 121. Shaft 120 is attached to hemispherical portions 122 and 123 and is received in rotating sleeve 124. Oil circulates through passageway 126. Oil within the hydrodynamic bearing is retained using diverging capillary seals 125.

Figure 6:
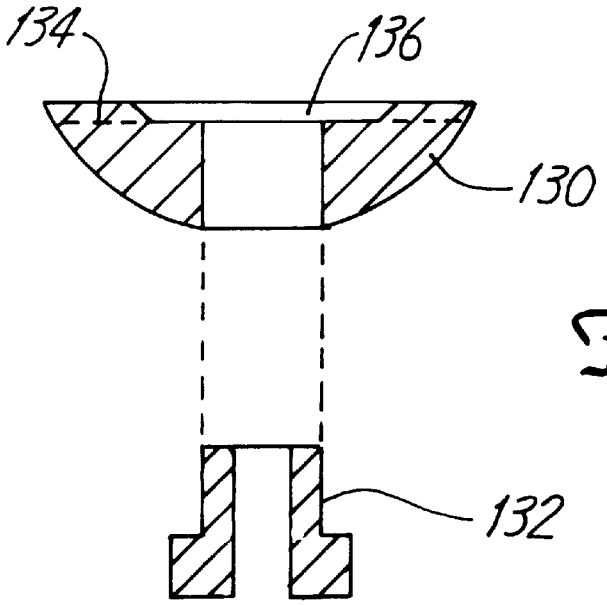
FIG. 6 is a cross-sectional view depicting assembly of a portion of a hydrodynamic bearing.

One technique for forming a hemisphere in accordance with the invention is metal injection molding. FIG. 6 is a cross-sectional view of a hemispherical portion formed by metal injection molding. In FIG. 6, hemisphere portion 130 is shown prior to mounting on shaft 132. Radial oil grooves 134 are formed in the top of portion 130 during molding. Portion 130 includes relief area 136 for oil backflow. Additionally, relief area 136 distributes forces on the outer diameter of portion 130 when portion 130 is used as a support surface. FIG. 6 shows a shoulder mount configuration where portion 130 rests on a shoulder of shaft 132. Attachment of portion 130 to shaft 132 may be through, for example, adhesive bonding.

Figure 7:
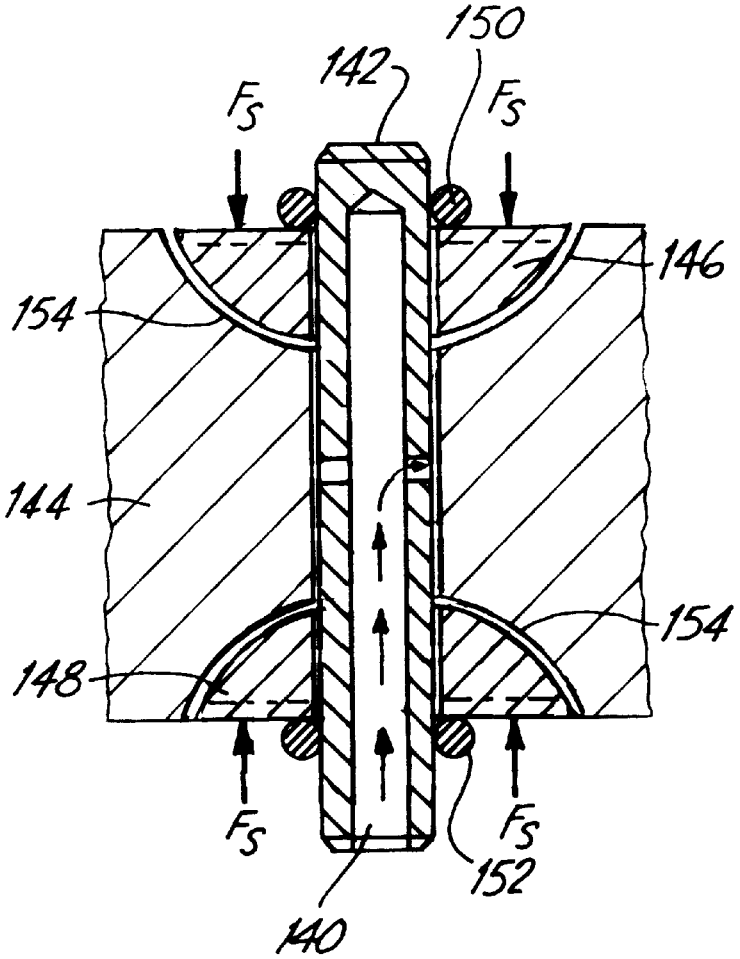
FIG. 7 is a cross-sectional view showing assembly of a hydrodynamic bearing in accordance with the invention.

Another technique for manufacturing a hydrodynamic bearing is shown in FIG. 7. In this design, pressurized air is applied to inlet 140 of shaft 142 which is received in sleeve 144. Shaft 142 is coupled to spherical portions 146 and 148. Adhesive is applied between portions 146 and 148 and shaft 142. O-ring seals 150 and 152 retain portions 146 and 148 relative to shaft 142. A force $F_S$ is applied to portions 146 and 148. This force balances the air pressure applied at 140 and is set to a predetermined limit to determine the size of gap 154. The flow rate of the applied air may be monitored to determine the size of gap 154. As an alternative to applying a known force $F_S$ to the bearing, members 146 and 148 can be held by a clamp which allows a sufficient gap 154 to form when pressurized air is applied. The size of the gap may be measured by monitoring the flow rate of the applied air. The adhesive used for bonding should be a low viscosity anaerobic adhesive. It should be placed along the inner diameter of the spherical members 146 and 148 prior to inserting the members onto shaft 142. The positive air pressure prevents adhesive from flowing into the hydrodynamic bearing area while O-rings 150 and 152 prevent the adhesive from seeping out of the adhesion area.

Figure 8:
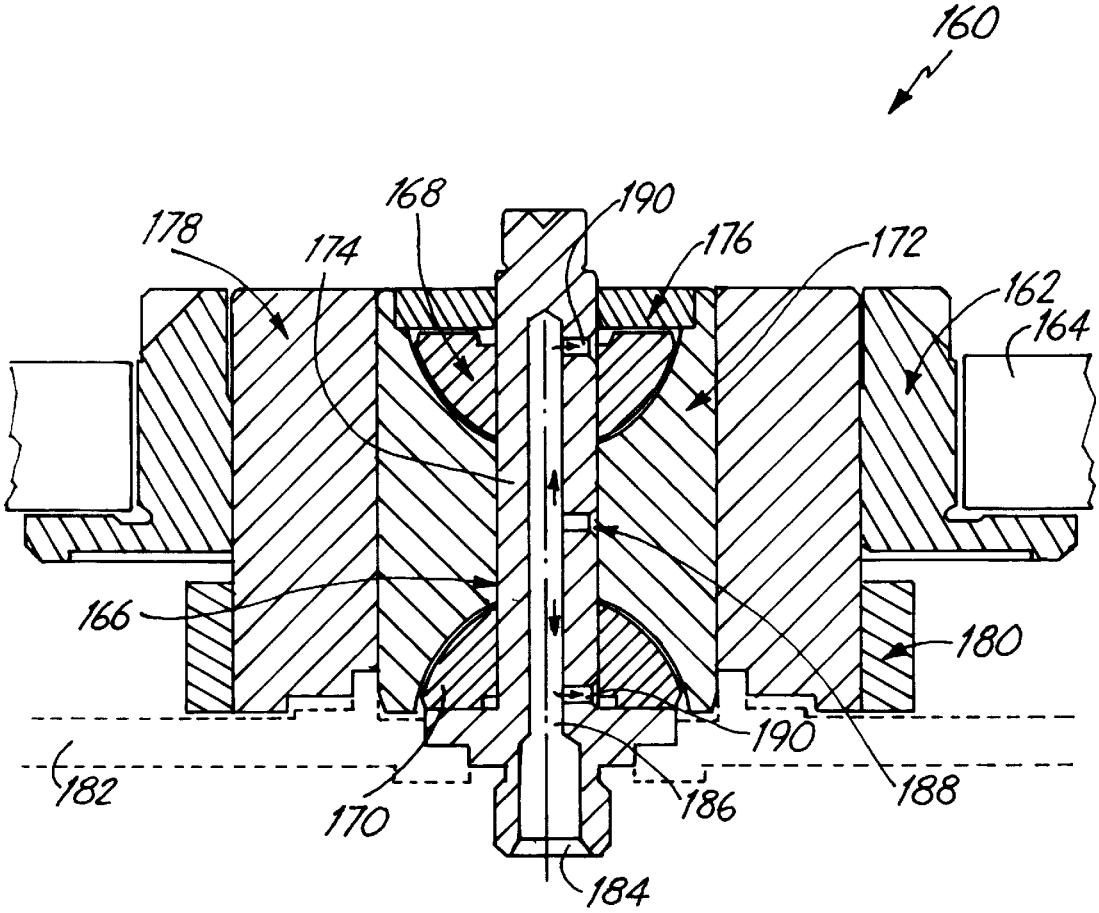
FIG. 8 is a cross-sectional view of a spindle assembly in accordance with another embodiment.

FIG. 8 is a cross-sectional view of spindle assembly 160 in accordance with another embodiment. Spindle 160 includes rotor hub 162 which carries disc 164, and is rotatably coupled to shaft 166. Shaft 166 includes upper hemisphere 168 and lower hemisphere 170 received in cartridge sleeve 172. Sleeve 172 receives journal 174 of shaft 166. The top portion of shaft 166 is sealed with seal 176, and journal 174 extends therethrough. Hub spacer 178 is coupled to rotor hub 162, and carries permanent magnets 180. Shaft 166 is received in base 182, and includes fill hole 184. Fill hole 184 connects to passageway 186, which extends through the center of shaft 166. Passageway 186 connects to center passageway 188 and distal passageways 190. In operation, oil flows into passageway 186 through center passageway 188 and out distal passageways 190. This is indicated by arrows shown in passageway 186.

Figures 9A, 9B:
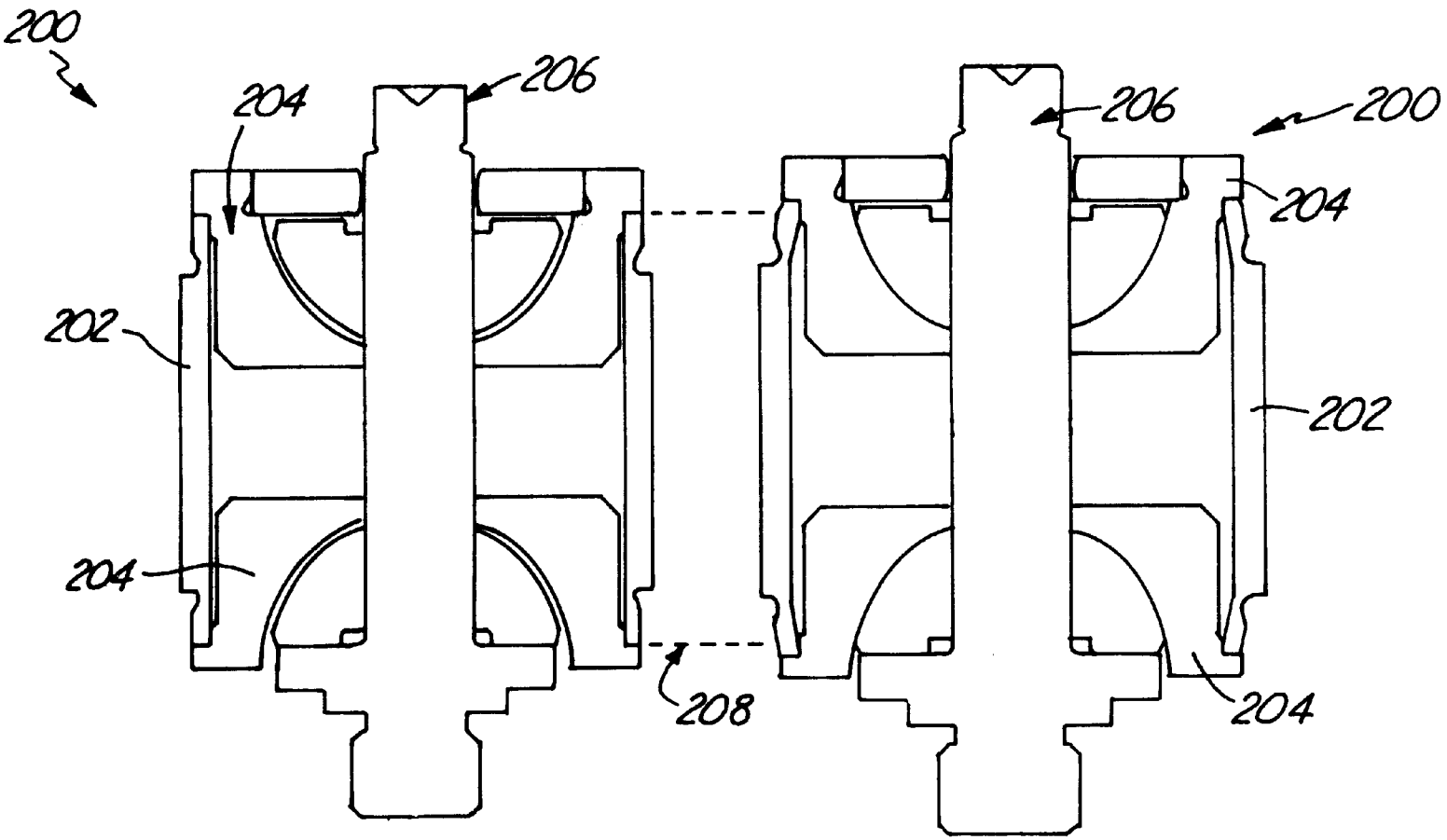
FIGS. 9A and 9B are cross-sectional views of another embodiment illustrative of a technique for thermo-compensation.

FIGS. 9A and 9B are cross-sectional views of spindle 200 in accordance with another embodiment, and are positioned to illustrate a technique for thermo-compensation. It has been noted that the viscosity of the lubricant changes over the operating range of a hydrodynamic bearing. This change has a pronounced effect on the load capacity, stiffness, and power consumption of the bearing. FIGS. 9A and 9B illustrate a technique for compensating for the change in lubricant viscosity by changing the gap size in the hydrodynamic bearing. In general, the gap size should be reduced as the temperature of the bearing is increased. In FIGS. 9A and 9B, spindle 200 includes expansion sleeve 202, sleeve 204 and shaft assembly 206. Thermo-compensation is achieved by utilizing a material having a low expansion coefficient for sleeve 204. Similarly, expansion sleeve 202 and shaft assembly 206 (including the hemispheres) are formed of a material having a higher expansion coefficient. FIG. 9A shows spindle 200 prior to expansion, while FIG. 9B shows spindle 200 at a greater temperature than in FIG. 9A following thermo-expansion. Line 208 shows the relevant change in position due to expansion between the two Figures. During the process of heating, the bearing seats expanded at a much slower rate than the rest of the components. Expansion sleeve 202 spreads the bearing seats apart at the same rate that the shaft and bearing hemispheres expand. This causes the bearing seats to effectively shrink towards the hemispheres. This causes a substantially uniform closure of the gap. The technique is independent of shaft and sleeve length because they are made of the same material. If the difference in thermo-expansion coefficients between the two different materials is about $14\times10^{-6}$° C., a change in temperature from 25° C. to 70° C. will result in a 3.5 mm radius hemispherical gap closing approximately 2.2 $\mu$m. These coefficients of expansion are provided by aluminum and 400 series stainless steel, respectively. Note that the expansion sleeve 202 should be flexible in the radial direction, where it attaches to the bearing seat, in order to prevent the bearing seat from distorting as the assembly changes temperature.

In the present invention, the interface of the hydrodynamic bearing is extended over a greater area than in prior art designs. This provides increased bearing stiffness and stability. Further, the restoring moment is determined based upon the length of a line which extends from the center of the journal to an outer edge of the bearing member. In typical prior art designs, the hydrodynamic bearing interface is at a perpendicular angle with the axis of rotation. However, in the present invention, an angle between the interface and the axis of rotation is acute, i.e. it is not parallel. This is achieved by making the bearing have a narrow width at an inner side and widen towards an outer edge of the bearing. The curved surface of the bearing also facilitates smooth operation and reduces the effects of external loads or shock or precession. Generally, forces on the bearing cause the hemisphere to rotate within the receiving portion about its center. It will be apparent that this design is less likely to be damaged than prior art flat thrust plate designs in which a small tilt of the drive shaft can cause the tip of the long level arm of the thrust plate to travel a relatively large distance.

Although the present invention has been described with reference to preferred embodiments, workers skilled in the art will recognize that changes may be made in form and detail without departing from the spirit and scope of the invention. For example, the hydrodynamic bearing of the invention is applicable to other typical spindle assemblies used in magnetic disc storage systems.

What is claimed is:

1. A magnetic disc storage system, comprising:

a base;

a rotatable magnetic storage disc having an axis of rotation;

a transducing head for reading and writing information on the disc;

a fixed member attached to the base, the fixed member having a shaft carrying opposing first and second convex bearing portions at opposite ends of the shaft and extending toward each other in inward directions along the axis of rotation and wherein the convex bearing portions have outwardly fixing surfaces which are substantially flat;

a rotating member attached to the disc which rotates relative to the fixed member on the axis of rotation, the rotating member including a first concave bearing portion rotatably engaging the first convex bearing portion forming a first bearing-interface therebetween having a first gap, the rotating member further including a second concave bearing portion rotatably engaging the second convex bearing portion forming a second bearing interface therebetween having a second gap, the rotating member further including a sleeve extending between the first and second concave bearing portions and rotatably receiving the shaft therethrough, the first and second interfaces forming acute angles with the axis of rotation;

lubricating fluid in the first and second gaps separating the first concave portion from the first convex portion and the second concave portion from the second *convex portion*; and means operably coupled to the rotating member for rotating the rotating member.

2. The magnetic disc storage system of claim 1 wherein the first and second interfaces are curved.

3. The magnetic disc storage system of claim 2 wherein the first and second interfaces form spherical portions.

4. The magnetic disc storage system of claim 1 wherein the first and second convex bearing portions are formed by metal injection molding and include grooves formed therein for interacting with the lubricating fluid.

5. The magnetic disc storage system of claim 1 wherein the first and second convex bearing portions are attached to the shaft by an adhesive.

6. The magnetic disc storage system of claim 1 wherein a coefficient of thermal expansion of the sleeve is greater than a coefficient of thermal expansion of the shaft.

7. The magnetic disc storage system of claim 1 including an oil path for carrying the lubricating fluid through the shaft, around the first and second convex bearing portions and between the shaft and the sleeve.

[8. The magnetic disc storage system of claim 1 wherein the first and second interfaces have widths at proximal ends which are less than widths at distal ends.]

9. The magnetic storage disc of claim 1 wherein the sleeve includes an expansion sleeve extending between the first and second concave bearing portions having a coefficient of expansion greater than a coefficient of expansion of the first and second concave bearing portions whereby a gap formed in the first and second interfaces has a size which changes inversely with temperature.

10. The magnetic storage disc of claim 9 wherein the first and second [spherical members] *convex bearing portions* and the shaft have an expansion coefficient substantially equal to the expansion coefficient of the expansion sleeve.

11. A magnetic disc storage system, comprising:

a base;

a rotatable magnetic storage disc having an axis of rotation;

a transducing head for reading and writing information on the disc;

a fixed member attached to the base, the fixed member having a sleeve carrying opposing first and second concave bearing portions at opposite ends of the sleeve;

a rotating member attached to the disc which rotates relative to the fixed member on the axis of rotation, the rotating member having a first convex bearing portion extending in an inward direction along the axis of rotation and rotatably engaging the first concave bearing portion forming a first bearing interface therebetween having a first gap, the rotating member further including a second convex bearing portion extending in an inward direction along the axis of rotation and rotatably engaging the second concave bearing portion forming a second bearing interface therebetween having a second gap, the rotating member further including a shaft extending between the first and second convex bearing portions and rotatably carried in the sleeve, the first and second convex bearing portions having outwardly facing surfaces which are substantially flat and wherein the first and second interfaces form acute angles with the axis of rotation;

lubricating fluid in the first and second gaps separating the first convex portion from the first concave portion and the second convex portion from the second *concave portion*; and means operably coupled to the rotating member for rotating the rotating member.

12. The magnetic disc storage system of claim 11 wherein the first and second interfaces are curved.

13. The magnetic disc storage system of claim 12 wherein the first and second interfaces form spherical portions.

14. The magnetic disc storage system of claim 11 wherein the first and second concave bearing portions are formed by metal injection molding and include grooves formed therein for interacting with the lubricating fluid.

15. The magnetic disc storage system of claim 11 wherein the first and second convex bearing portions are attached to the shaft by an adhesive.

16. The magnetic disc storage system of claim 11 wherein a coefficient of thermal expansion of the sleeve is greater than a coefficient of thermal expansion of the shaft.

17. The magnetic disc storage system of claim 11 including an oil path for carrying the lubricating fluid through the shaft, around the first and second concave bearing portions and between the shaft and the sleeve.

[18. The magnetic disc storage system of claim 11 wherein the first and second interfaces have widths at proximal ends which are less than widths at distal ends.]

19. The magnetic storage disc of claim 11 wherein the sleeve includes an expansion sleeve extending between the first and second [convex] *concave* bearing portions having a coefficient of expansion greater than a coefficient of expansion of the first and second [convex] *concave* bearing portions whereby a gap formed in the first and second *bearing* interfaces has a size which changes inversely with temperature.

20. The magnetic disc storage system of claim 19 wherein the first and second [spherical members] *convex bearing portions* and the shaft have an expansion coefficient substantially equal to the expansion coefficient of the expansion sleeve.

*21. A motor having a hydrodynamic bearing comprising:*

*a fixed member having a shaft carrying opposing first and second convex bearing portions at opposed ends of the shaft and extending toward each other in inward directions along an axis of rotation and wherein the convex bearing portions have outwardly fixing surfaces which are substantially flat;*

*a rotating member which rotates relative to the fixed member on the axis of rotation, the rotating member including a first concave bearing portion rotatably engaging the first convex bearing portion forming a first bearing interface therebetween having a first gap, the rotating member further including a second concave bearing portion rotatably engaging the second convex bearing portion forming a second bearing interface therebetween having a second gap, the rotating member further including a sleeve extending between the first and second concave bearing portions and rotatably receiving the shaft therethrough, the first and second bearing interfaces forming acute angles with the axis of rotation; and*

*lubricating fluid in the first and second caps separating the first concave portion from the first convex portion and the second concave portion from the second convex portion.*

*22. The motor of claim 21 wherein the first and second bearing interfaces are curved.*

*23. The motor of claim 22 wherein the first and second interfaces form spherical portions.*

*24. The motor of claim 21 wherein the first and second convex bearing portions are formed by metal infection molding and include grooves formed therein for interacting with the lubricant fluid in the first and second gaps separating the first concave portion from the first convex portion and the second concave portion from the second convex portion.*

*25. The motor of claim 21 wherein the first and second convex bearing portions are attached to the shaft by an adhesive.*

*26. The motor of claim 21 wherein a coefficient of thermal expansion of the sleeve is greater than a coefficient of thermal expansion of the shaft.*

*27. The motor of claim 21 including an oil path for carrying the lubricant fluid through the shaft around the first and second convex bearing portions and between the shaft and the sleeve.*

*28. The motor of claim 21 wherein the first and second interfaces have widths at proximal ends adjacent ends of the shaft which are less than the width at distal ends spaced from ends of the shaft.*

*29. The motor of claim 21 wherein the sleeve includes an expansion sleeve extending between the first and second concave bearing portions having a coefficient of expansion greater than a coefficient of expansion of the first and second concave bearing portions whereby a gap formed in the first and second bearing interfaces has a size which changes inversely with temperature.*

*30. The motor of claim 29 wherein the first and second convex bearing portions and the shaft have an expansion coefficient substantially equal to the expansion coefficient of the expansion sleeve.*

*31. A motor having a hydrodynamic bearing comprising:*

*a fixed member having a sleeve carrying opposing first and second concave bearing portions at opposed ends of the sleeve;*

*a rotating member which rotates relative to the fixed member on an axis of rotation, the rotating member having a first convex bearing portion extending in an inward direction along the axis of rotation and rotatably engaging the first concave bearing portion forming a first bearing interface therebetween having a first gap, the rotating member further including a second convex bearing portion extending in an inward direction along the axis of rotation and rotatably engaging the second concave bearing portion forming a second bearing interface therebetween having a second gap, the rotating member further including a shaft extending between the first and second convex bearing portions and rotatably carried in the sleeve, the first and second convex bearing portions having outwardly facing surfaces which are substantially flat and wherein the first and second bearing interfaces form acute angles with the axis of rotation; and*

*lubricating fluid in the first and second gaps separating the first convex portion from the first concave portion and the second convex portion from the second concave portion.*

*32. The motor of claim 31 wherein the first and second bearing* interfaces are curved.

*33. The motor of claim 32 wherein the first and second bearing* interfaces are spherical portions.

*34. The motor of claim 31 wherein the first and second concave bearing portions are formed by metal injection molding and include grooves formed therein for interacting with the lubricant fluid in the first and second gaps separating the first convex portion from the first concave portion and the second convex portion from the second concave portion.*

*35. The motor of claim 31 wherein the first and second convex bearing portions are attached to the shaft by an adhesive.*

*36. The motor of claim 31 wherein a coefficient of thermal expansion of the sleeve is greater than the coefficient of thermal expansion of the shaft.*

*37. The motor of claim 31 including an oil path for carrying a lubricating fluid through the shaft, around the*

*first and second concave bearing portions in between the shaft and the sleeve.*

*38. The motor of claim 31 wherein the first and second bearing interfaces have widths at proximal ends adjacent ends of the shaft which are less than widths at distal ends spaced from ends of the shaft.*

*39. The motor of claim 31 wherein the sleeve includes an expansion sleeve extending between the first and second concave bearing portions having a coefficient of expansion greater than a coefficient expansion of the first and second concave bearing portions whereby a gap formed in the first and second bearing interfaces has a size changes inversely with temperature.*

*40. The motor of claim 39 wherein the first and second convex bearing portions and the shaft have an expansion coefficient substantially equal to the expansion coefficient of the expansion sleeve.*

* * * * *